Figure 1:
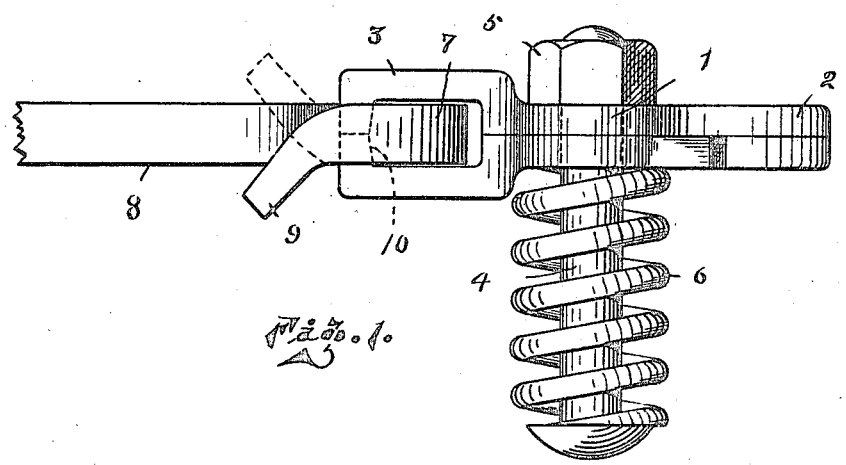

A. B. STARKEY.
SLIP CLEVIS.
APPLICATION FILED MAR. 31, 1920.

1,384,217.

Patented July 12, 1921.

WITNESSES:
M. E. Fay.
L. C. Bronson.

INVENTOR
Alan B. Starkey.
BY
Geo. Stevens.
ATTORNEY

UNITED STATES PATENT OFFICE.

ALAN B. STARKEY, OF DULUTH, MINNESOTA.

SLIP-CLEVIS.

1,384,217.  Specification of Letters Patent.  Patented July 12, 1921.

Application filed March 31, 1920. Serial No. 370,062.

*To all whom it may concern:*

Be it known that I, ALAN B. STARKEY, a citizen of the United States, residing at Duluth, in the county of St. Louis and State of Minnesota, have invented certain new and useful Improvements in Slip-Clevises, of which the following is a specification, reference being had therein to the accompanying drawing.

This invention relates to draft attachments and has special reference to a combination sister hook and slip clevis which is designed particularly for use upon pulling lines such as are employed in the handling of grain scrapers in and about elevators and the like.

The principal object is to provide an attachment intermediate of the end of the pulling line and the attachment to a scraper, such as employed in the art referred to, that will avoid damage of any character when the scraper or other object being pulled, suddenly or unexpectedly encounters an obstruction, such as the side of a car door opening or edge of a bin.

It is well known to those versed in the art how frequently accidents of this nature happen which result in the breaking of the line or damage to other parts of the mechanism employed.

Other objects and advantages of the specific structure will appear in the further description of the invention.

Figure 2:
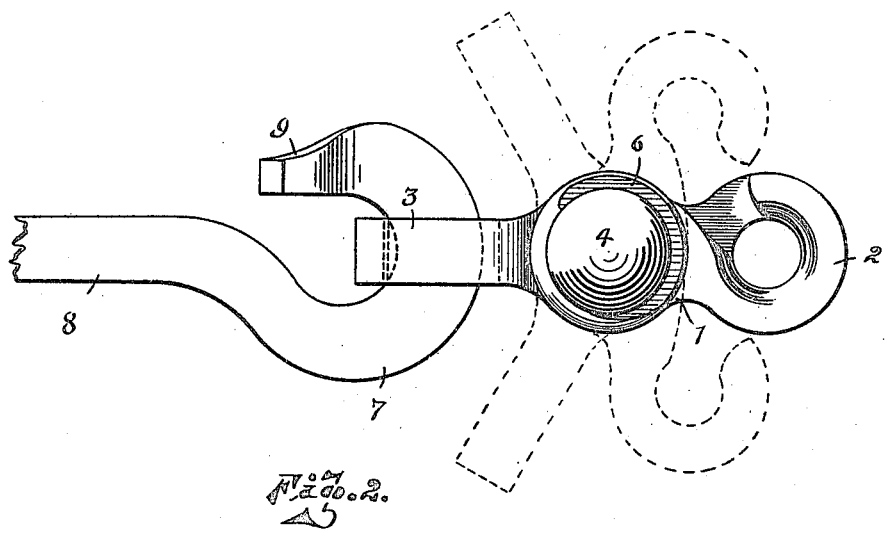

In the accompanying drawings forming part of this application and in which like reference characters indicate like parts;

Figure 1 is an edge elevation of my improved device having an engaging hook shown in the clevis portion thereof, and Fig. 2 is a view taken at right angles to Fig. 1, showing the opened position of the device in dotted lines.

The body portion of the mechanism comprises two like halves of flat metal each having a central circular hub portion 1, and one end formed into a hook 2, the circular hole or opening through which is axially parallel with the hole in the hub while the opposite end is formed into a hooked portion 3, the opening through which is substantially rectangular in form and disposed transverse the axial line of the hole in the hub portion.

A holding bolt 4 is mounted within the hole in the hub portion and held therein by a suitable nut 5, while intermediate of the head of the bolt and the body portion of the hooks, is mounted an expansive spiral spring 6, the two coöperatively assembled halves of the device being disposed upon the bolt intermediate of the end of the spring and the nut 5. The open portions of the hooks 2 are oppositely disposed as in a common sister hook, so that when properly alined the circular hole appears to extend therethrough, and into which any desired form of link or loop, not shown, on the end of a draft line may be engaged without disassembling the device.

The opening intermediate of the hooked clevis ends of the device is substantially rectangular in form, through which the hooked end 7 of a suitable draw bar 8 may be applied, and this hook 7 is formed with its nib or point 9 turned at an angle so as to prevent its being readily dislodged through the clevis, and in practice the hook 7 is placed with the nib pointing upwardly as shown in dotted lines, Fig. 1, rather than downwardly, as shown in full lines, the object of which is to make use of the gravitating of the laterally protruding bolt 4 and spring 6, which will always normally hang depending as shown in Fig. 1, and were the hook 7 applied as shown in Fig. 1 it is readily seen how any undue slack and motion of the line to which the device is attached would readily slip the clevis down over the nib of the hook.

The holes through the hubs of the halves of the device are made considerably larger in diameter than the bolt 4 to permit of the free contracting and separating of the halves. The inside walls of the extremities of the hooked clevis portions are made slightly inclined as at 10, so that when a sudden and abrupt jerk occurs upon the line the hook 7 will slip itself free from engagement within the clevis, the spring 6 permitting of the proper separation of the clevis ends of the members of the device.

When it is desired to attach the hooked end of the device to a ring or loop it is readily understood that the two halves thereof may be pivotally adjusted as shown in dotted lines, Fig. 2, for such purpose.

Having thus described my invention, what I claim as new and desire to secure by Letters Patent is:

1. A device of the character described comprising two like, pivotally attached halves, the ends of said halves, upon one side of the pivotal connection thereof, being hooked at right angles to their pivotal connection, and the opposite ends hooked in parallelism with said connection whereby a rectangular shaped opening is formed intermediate of the last mentioned ends at right angles to the pivotal connection, and a circular opening is formed parallel with said pivotal connection in the opposite ends when the halves are in their coöperatively registering position, a bolt forming said pivotal connection of the halves, an expansive spiral spring intermediate of the head of the bolt and the engaged halves and a hook, rectangular in cross section, coöperatively engaged within the rectangular openings formed by the first mentioned hooks, substantially as and for the purpose described.

2. The combination with a device as set forth in claim 1, of a draft hook the nib of which is turned laterally, substantially as and for the purpose described.

In testimony whereof I hereunto affix my signature in the presence of two witnesses.

ALAN B. STARKEY.

Witnesses:
ELLEN THEORIN,
S. GEO. STEVENS.